(12) United States Patent
Foelsche

(10) Patent No.: US 7,025,033 B2
(45) Date of Patent: Apr. 11, 2006

(54) METHOD AND ARRANGEMENT FOR CONTROLLING A DRIVE UNIT INCLUDING AN INTERNAL COMBUSTION ENGINE

(75) Inventor: Volkmar Foelsche, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 10/356,642

(22) Filed: Feb. 3, 2003

(65) Prior Publication Data

US 2003/0145808 A1 Aug. 7, 2003

(30) Foreign Application Priority Data

Feb. 1, 2002 (DE) ................ 102 04 129

(51) Int. Cl.
*F02D 17/02* (2006.01)
(52) U.S. Cl. .............................. 123/198 DB
(58) Field of Classification Search ......... 123/198 DB, 123/198 DC, 198 F, 350, 329, 339.16
See application file for complete search history.

(56) References Cited

U.S. PATENT DOCUMENTS

| | | | |
|---|---|---|---|
| 3,750,632 A * | 8/1973 | Zechnall ...................... 123/350 |
| 4,437,442 A * | 3/1984 | Yamaguchi .................. 477/111 |
| 5,062,400 A * | 11/1991 | Minegishi ............ 123/198 DB |
| 5,522,360 A * | 6/1996 | Suzuki et al. ................ 123/329 |
| 5,730,098 A * | 3/1998 | Sasaki et al. ......... 123/198 DB |
| 5,921,216 A * | 7/1999 | Ballman et al. ............. 123/321 |
| 6,155,230 A * | 12/2000 | Iwano et al. ............ 123/339.16 |
| 6,260,535 B1 * | 7/2001 | Froeschl et al. ...... 123/198 DB |
| 6,305,343 B1 * | 10/2001 | Sato et al. ............ 123/198 DB |
| 6,474,291 B1 * | 11/2002 | Collins et al. ........ 123/198 DB |
| 6,604,502 B1 * | 8/2003 | Bisaro et al. ......... 123/198 DB |
| 6,615,776 B1 * | 9/2003 | Von Andrian-Werburg ...... 123/90.15 |

FOREIGN PATENT DOCUMENTS

EP 1 054 150 11/2000

* cited by examiner

*Primary Examiner*—Henry C. Yuen
*Assistant Examiner*—Jason Benton
(74) *Attorney, Agent, or Firm*—Walter Ottesen

(57) ABSTRACT

The invention relates to a method and an arrangement for controlling a drive unit (1) including an internal combustion engine (5). The method and arrangement function to provide a switchoff of the engine (5) with less vibration. In the internal combustion engine (5), the air or a mixture of air and fuel is compressed in a combustion chamber (10) while utilizing a compressing device (15) and especially a piston. A supply of fuel is reduced with a switchoff of the engine (5). When switching off the engine (5), a relief of load of the compressing device (15) is initiated in addition to the reduction of the metering of fuel.

11 Claims, 3 Drawing Sheets

METHOD AND ARRANGEMENT FOR CONTROLLING A DRIVE UNIT INCLUDING AN INTERNAL COMBUSTION ENGINE

BACKGROUND OF THE INVENTION

U.S. Pat. No. 6,305,343 discloses a control system for switching off a diesel engine wherein vibrations are reduced via a slow reduction of the fuel quantity injected into the cylinders.

SUMMARY OF THE INVENTION

The method and arrangement of the invention for controlling a drive unit including an internal combustion engine afford the advantage compared to the above in that, when switching off the engine, in addition to the reduction of the fuel metering, a lightening of load of the compression means is initiated. In this way, the vibrations when switching off the engine can be still further reduced. These vibrations arise because of the compression and decompression of air in the combustion chamber of the engine.

The above is especially advantageous in vehicles having hybrid drives or vehicles having a start/stop system, which switch off the engine in specific situations without the driver explicitly requesting the same. This switchoff, which possibly occurs frequently during a drive of the vehicle, can thereby be comfortably realized.

It is especially advantageous when the reduction of load on the compression means is initiated in a first step via a reduction of the torque, which is to be outputted by the engine, and in a second step, via the shortening of the compression phase and, in a third step, by a continuous opening of the inlet and outlet valves of the combustion chamber. In this way, several measures for lightening the compression means are carried out together so that a considerable relief or lightening of the compression means is realized and an especially significant reduction of the vibrations can be achieved when switching off the engine. The switchoff of the engine can thereby be realized in a still more comfortable way for the driver when the switchoff is for the internal combustion engine of a vehicle.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
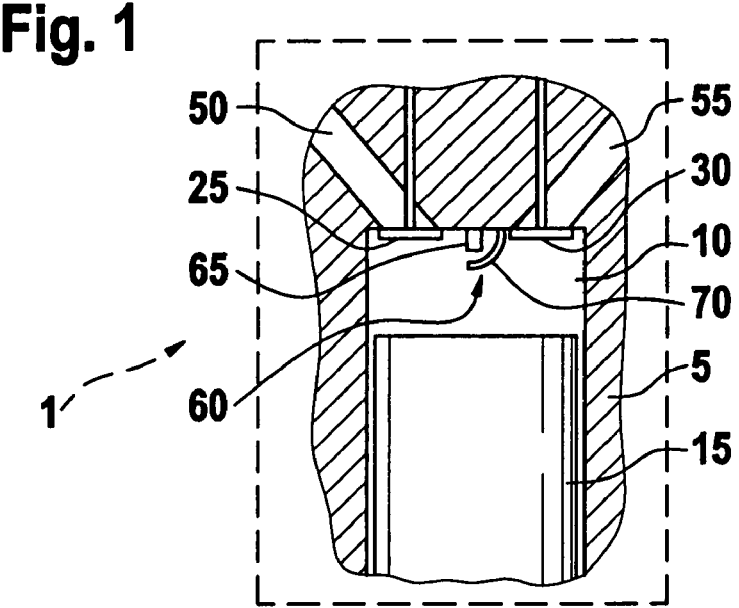
FIG. 1 is a schematic detail of an internal combustion engine.

In FIG. 1, reference numeral 1 identifies a drive unit which can, for example, be a drive unit of a motor vehicle. The drive unit 1 includes an internal combustion engine 5. As an option, the drive unit can include an additional motor such as an electric motor in order to realize a hybrid drive. The internal combustion engine 5 includes at least one combustion chamber 10 which, for example, is arranged in a cylinder of the engine 5. The engine 5 can comprise several cylinders having respective combustion chambers shown by way of example in FIG. 1. As shown in FIG. 1, compression means 15 are provided in the combustion chamber 10. In the following, it can be assumed by way of example that the compression means 15 is a piston.

During operation of the engine 5, the piston 15 moves up and down in the combustion chamber 10 and drives, for example, a crankshaft via a connecting rod. In this example, an air/fuel mixture can be supplied via an inlet channel 50 in the combustion chamber 10. The inlet channel 50 can be opened and closed with respect to the combustion chamber 10 via an inlet valve 25. Furthermore, an ignition device 60 can be provided in the combustion chamber 10 and, most importantly, when the engine 5 is a spark-ignition engine. The ignition device 60 can, for example, be configured as a spark plug and project into the combustion chamber 10 with a center electrode and a ground electrode.

In FIG. 1, the center electrode is identified by reference numeral 65 and the ground electrode is identified by reference numeral 70. An ignition spark for igniting the air/fuel mixture can be generated between the center electrode 65 and the ground electrode 70. The air/fuel mixture is supplied into the combustion chamber 10 via the inlet channel 50 and is compressed by the piston 15. Furthermore, an outlet channel 55 leads to the combustion chamber 10 and functions for receiving and conducting away the exhaust gases which arise during the combustion of the air/fuel mixture in the combustion chamber 10. The outlet channel 55 can be opened or closed relative to the combustion chamber 10 via an outlet valve 30.

The inlet valve 25 and the outlet valve 30 can be actuated either via a common camshaft or by camshafts which are assigned to corresponding ones of the valves. The camshaft or camshafts can be driven by the crankshaft, for example, at a transmission ratio of 2:1 in order to realize a four-stroke engine. Two revolutions of the camshaft are then translated into one rotation of the camshaft or camshafts.

The inlet valve 25 and the outlet valve 30 can be driven alternately directly and therefore independently of the crankshaft for opening or closing the inlet channel 50 or the outlet channel 55.

Figure 2:
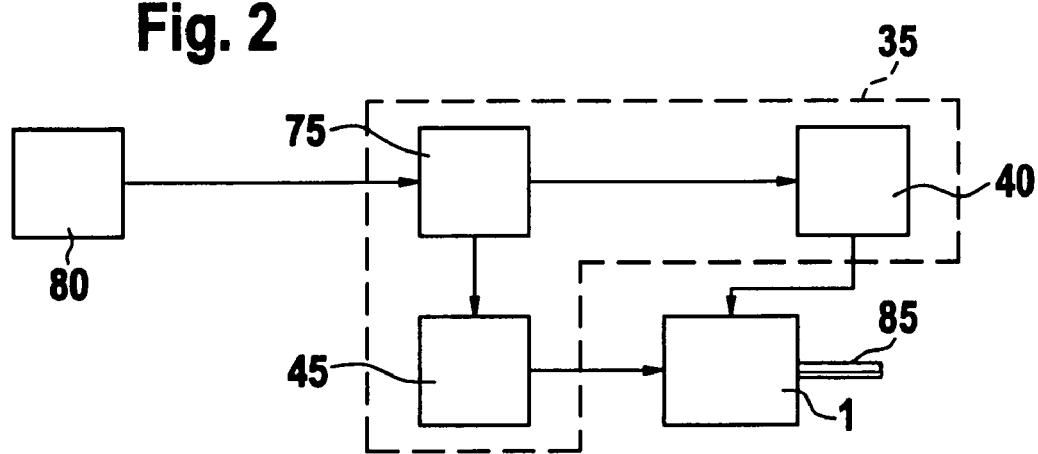
FIG. 2 is a block circuit diagram of an arrangement according to the invention for controlling a drive unit which includes an internal combustion engine.

In conventional internal combustion engines, the switchoff of the drive unit 1 is realized by an abrupt reduction or continuous decrease of the metered fuel. Depending upon the type of engine and installation, for example, in a vehicle, this can lead to vibrations which are clearly noticeable. These vibrations arise because of the compression and decompression of air in the combustion chamber 10 of the engine 5 even when the metering of fuel has already been interrupted. For this reason, and according to the invention, an arrangement 35 is provided as shown in FIG. 2 which includes an electronic control unit 75 as well as means 40 for reducing the metering of fuel and means 45 for relieving the load on the piston 15. The means 40 for reducing the metering of fuel and the means 45 for relieving the piston 15 are each driven by the electronic control unit 75.

In FIG. 2, reference numeral 80 characterizes means for switching off the internal combustion engine 5. These means are connected to the arrangement 35, that is, to the electronic control unit 75. The means 80 for switching off the engine 5 can, for example, be an ignition lock. The ignition lock can be actuated by an operator with an ignition key for switching off the engine 5.

The means 80 for switching off the engine 5 can, for example, be a control apparatus of a hybrid drive of a vehicle. In addition to the internal combustion engine 5, the drive unit can also include an additional motor, for example, an electric motor. Depending upon the driving situation, the internal combustion engine 5 can be switched off in that the control apparatus of the hybrid system outputs a corresponding command to the electronic control unit 75 for switching off the internal combustion engine 5. The means 80 for switching off the engine 5 can, for example, be configured also as a control apparatus of a start/stop system of a vehicle which generates a command for switching off the engine and outputs the same to the electronic control unit 75 for the purpose of saving fuel in specific situations, for example, when the vehicle is at standstill at a traffic light or is at standstill in a traffic jam.

The means 40 for reducing the supply of fuel and the means 45 for relieving the piston 15 are each connected to the drive unit 1. In FIG. 2, the crankshaft, which is driven by the drive unit 1, is shown by way of example and is identified by reference numeral 85.

The means 40 for reducing the fuel supply is activated by the electronic control unit 75 when a corresponding switchoff command from the means 80 is received in the electronic control unit 75 for switching off the engine 5. The means 40 for reducing the supply of fuel ensures that no fuel is anymore outputted into the inlet channel 50. The reduction of the fuel supply to zero can be abrupt, that is, jump-like or continuous, that is, uniform. To reduce the vibrations of the engine 5 connected with the reduction of the supply of fuel, the compression means (that is, the piston 15) is relieved of load by the means 45 in accordance with the invention when switching off the internal combustion engine 5. This relief of load can be initiated by the electronic control unit 75 in advance of or during the activation of the means 40 for reducing the supply of fuel by a corresponding drive of the means 5. The relief of the piston 15 leads to the situation that the piston 15 can run as close to idle as possible in the combustion chamber 10 of the corresponding cylinder and therefore can fade out without resistance when the fuel supply is reduced in the manner described. When switching off the internal combustion engine 5, the piston 15 is, for the most part, hindered from compressing or decompressing the air disposed in the combustion chamber 10. In this way, the disturbing vibrations while switching off the engine 5 are considerably reduced.

Figure 3:
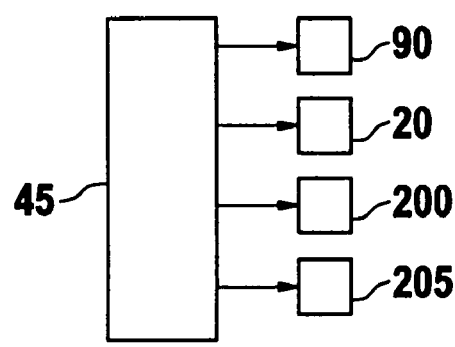
FIG. 3 is a block circuit diagram of means for reducing load on the compression means of an internal combustion engine.

In FIG. 3, the means 45 for relieving the piston 15 is shown again. The relief of the piston 15 can be realized in different ways. Thus, the means 45 can be, for example, connected to an ignition control 90 in order to adjust the ignition time point for the ignition device 60. Additionally, or as an alternative, the means 45 can be connected to a throttle flap control 20 in order to control the degree of opening of the throttle flap for the air supply into the inlet channel 50. The throttle flap itself is not shown in FIG. 1 for the sake of clarity. Additionally or, as an alternative, the means 45 can be connected to a valve control 200 in order to control the opening and closing times of the inlet valve 25 and of the outlet valve 30. Additionally or, as an alternative, the means 45 can also be connected to a cylinder control 205 in order to switch off individual cylinders, for example, via a continuous opening of the inlet valve 25 and of the outlet valve 30.

A possibility for relieving the piston 15 is to reduce the torque to be outputted by the internal combustion engine 5 via the crankshaft 85. This torque is reduced, for example, to a pregiven minimum value. The pregiven minimum value can, for example, correspond to the minimum possible torque which the internal combustion engine 5 can output via the crankshaft 85.

The reduction of the torque, which is to be outputted by the engine 5 via the crankshaft 85, can, for example, be brought about by retarding the ignition time point of the ignition device 60. For this purpose, the means 45 for relieving load of the piston 15 correspondingly controls the ignition device 90 in order to obtain an ignition time point as retarded as possible, for example, in a phase wherein the piston 15 transfers from the compression of the air/fuel mixture, which is introduced into the combustion chamber 10, into a subsequent decompression phase. In this way, the efficiency of the combustion and therefore the load of the piston 15 can be reduced.

In addition, or alternatively, the means 45 can drive the throttle flap control 20 in such a manner that the throttle flap control 20 opens the throttle flap for the air supply into a non-fired state of the combustion chamber 10. In the non-fired state of the combustion chamber 10, only air and no fuel is conducted into the combustion chamber 10. With this opening of the throttle flap, the air in the inlet channel 50 can circulate unhindered so that no pressure is applied to the piston 15 and this piston can freely oscillate to standstill.

Figure 4:
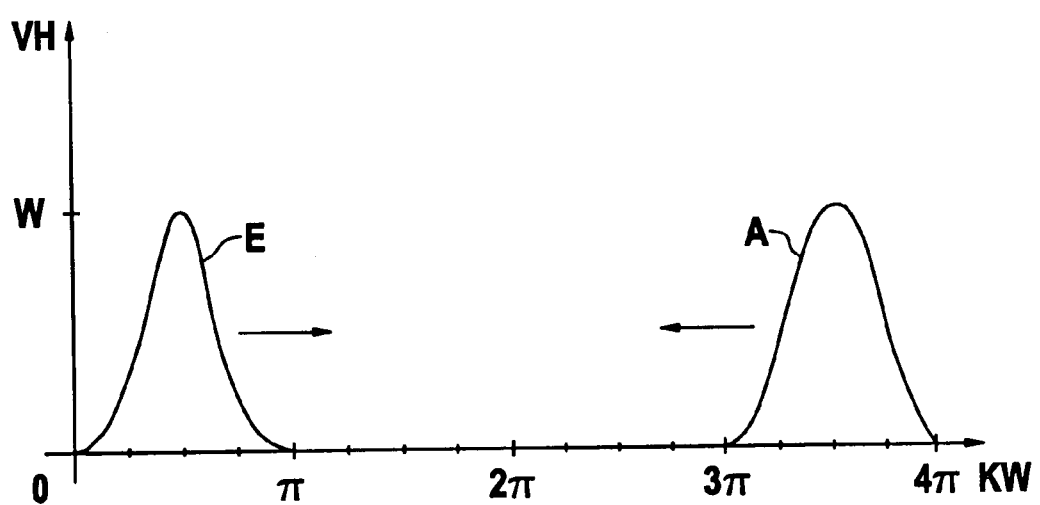
FIG. 4 is a diagram of a valve stroke plotted as a function of a crankshaft angle; and, FIG. 5 is a flowchart showing the sequence of the steps of the method of the invention.

Additionally, or alternatively, the means 45 can drive the valve control 200 so that a shortening of the compression phase of the piston 15 is brought about for relieving load of the piston 15. In FIG. 4, the valve stroke VH of the inlet valve 25 and of the outlet valve 30 are shown as a function of the crankshaft angle KW of the crankshaft 85 in the fired state of the combustion chamber 10. For crankshaft angles $0<KW<=\pi$, the inlet valve 25 is opened up to a maximum valve stroke W for inducting the air/fuel mixture into the combustion chamber 10. The piston 15 moves downwardly in the combustion chamber 10. The outlet valve 30 is closed in this first phase. In a second phase, for which the relationship $\pi<KW<=2\pi$ applies for the crankshaft angle KW, the compression of the inducted air/fuel mixture takes place in the combustion chamber 10 in that the piston 15 is moved upwardly in the combustion chamber 10. This second phase is also characterized as compression phase. Here, the inlet valve 25 as well as the outlet valve 30 are closed. In a third phase, which is characterized also as a decompression phase, the following applies for the crankshaft angle KW: $2\pi<KW<=3\pi$. This phase is the work phase of the internal combustion engine 5 wherein the piston 15 is moved again downwardly in the combustion chamber 5 by the expansion of the air/fuel mixture which is ignited in the compression phase. In this third phase too, the inlet valve 25 and the outlet valve 30 are closed. In a fourth phase, wherein the following applies for the crankshaft angle: $3\pi<KW<4\pi$, the outlet valve 30 is opened up to the maximum valve stroke W. In this fourth phase, the piston 15 moves upwardly in the combustion chamber 10 and presses the exhaust gas into the outlet channel 55 which has arisen because of the combustion of the air/fuel mixture. The valve stroke VH for the inlet valve 25 is identified in FIG. 4 by reference character E and the valve stroke VH for the outlet valve 30 is identified in FIG. 4 by the reference character A.

The load of the piston 15 and therefore the compression and/or the decompression of the gases, which are disposed in the combustion chamber 10, can be reduced when the compression phase and/or the decompression phase is shortened. This can, for example, be achieved in that the time is shortened in which the inlet valve 25 and the outlet valve 30 of the combustion chamber 10 are simultaneously closed. As indicated in FIG. 4 by arrows, this can be realized in that the inlet valve 25 has a valve stroke VH>0 also in the second phase and, if required, in the third phase and is thereby opened and/or the outlet valve 30 is opened also in the third phase and, if required, in the second phase, and there has a valve stroke VH>0.

An influencing of the compression phase and/or decompression phase in this manner can be realized when the inlet valve 25 and/or the outlet valve 30 can be driven directly via the valve control 200. If the opening and closing of the inlet valve 25 and/or of the outlet valve 30 takes place via one or several camshafts, then the described shortening of the compression phase and/or of the decompression phase can be realized when the camshaft or camshafts are adjustable. For this purpose, an actuating member is provided which is correspondingly driven by the valve control 200 and brings about the wanted adjustment of the camshafts by shortening the compression phase and/or the decompression phase.

By shortening the compression phase and/or the decompression phase, the engine 5 is limited during switchoff likewise in the compression/decompression of the gases, which are present in the combustion chamber 10. The piston 15 is thereby relieved of load.

In addition, or alternatively, the means 45 can drive the cylinder control 205 in such a manner that one or several of the cylinders of the engine 5 are mechanically switched off. This can be realized in that the cylinder control 205 controls the inlet valve 25 and the outlet valve 30 either directly or via the actuating member for the camshaft or the camshafts in such a manner that the inlet valve 25 and the outlet valve 30 of the combustion chamber 10 are opened continuously, that is, for crankshaft angle $0<KW<=4\pi$ during switchoff of the internal combustion engine 5.

This measure leads to the situation that no compression and no decompression takes place any longer and thereby makes possible the most effective relief of load of the piston 15.

At the latest, when the means 45 has initiated the relief of load of the piston 15 in the manner described, the control unit 75 causes the means 40 for reducing the fuel supply to abruptly reduce the fuel supply into the inlet channel 50, that is, jump-like, or continuously, that is, uniformly to zero. This then leads to the actual switchoff of the internal combustion engine 5.

With the described measures, a switchoff of the engine 5 with less vibrations can be realized. This is especially important when the internal combustion engine is frequently not switched off by the driver, as in cases of vehicles having hybrid drives or start/stop systems. The low vibration switchoff of the internal combustion engine 5 increases the driving comfort and the comfort of the driver and thereby the acceptance of such start/stop systems or hybrid drives in a vehicle.

Figure 5:
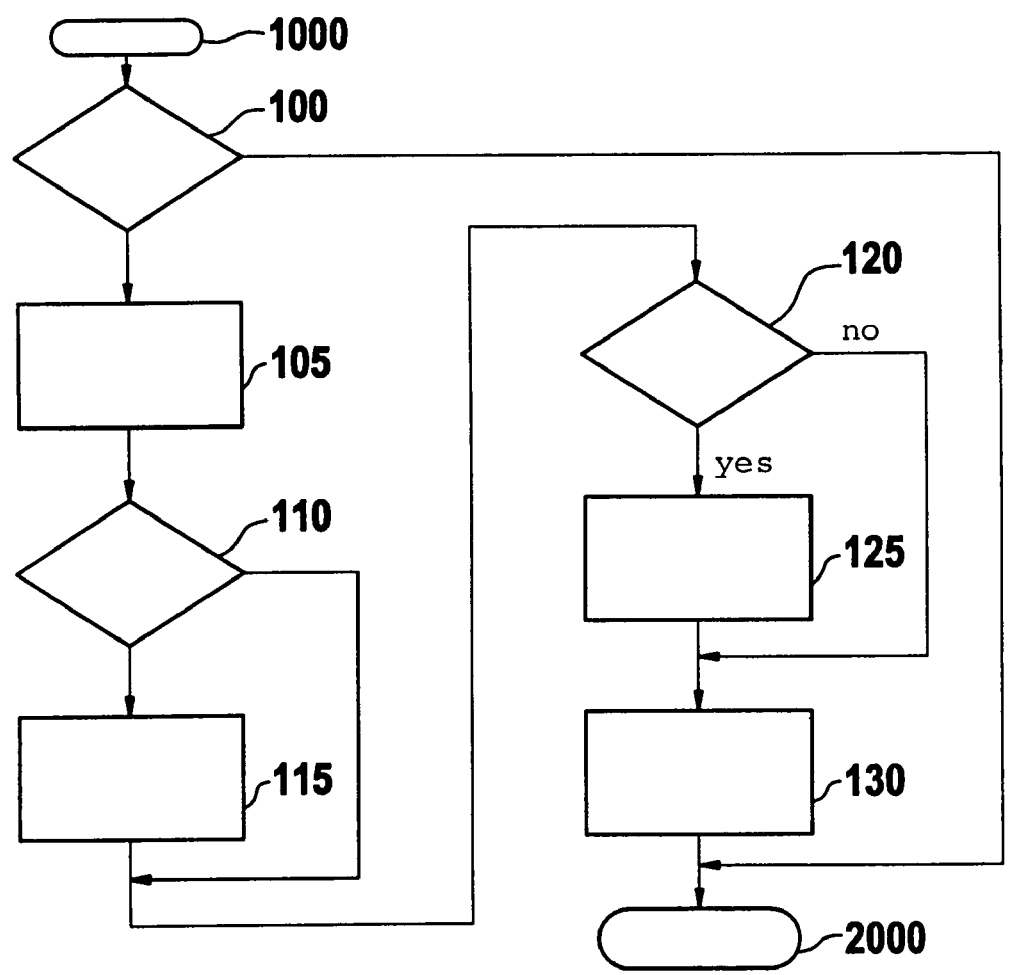

A sequence plan is shown in FIG. 5, which, by way of example, describes the sequence of the method of the invention. After a start 1000 of the program, the electronic control unit 75 checks at a program point 100 whether a command for switchoff of the engine 5 was received by the means 80 for switching off the internal combustion engine 5. If this is the case, then the program branches to program point 105; otherwise, there is a movement out of the program and a branching to the end 2000 of the program. At program point 105, the electronic control unit 75 activates the means 45 for relieving load on the piston 15. The means 45 thereupon controls the ignition control 90 in such a manner that a delay of the ignition time point is brought about and thereby a reduction of the torque is realized which is to be outputted by the engine 5 via the crankshaft 85. Thereafter, the program branches to program point 110. At program point 110, the means 45 for relieving the load of the piston 15 checks whether the inlet valve 25 and/or the outlet valve 30 can be driven directly or via an actuating member for shifting the camshaft. If this is the case, then the program branches to program point 115; otherwise, the program branches to program point 120. The check at program point 110 can be realized in that the means 45 inquires as to the presence of the valve control 200. With the presence of valve control 200, a drive of the inlet valve 25 and/or of the outlet valve 30 is detected as being realizable. Alternatively, the described check can be omitted with a corresponding preconfiguration.

At program point 115, the means 45 for relieving load of the piston 15 trigger the valve control 200 so that the compression phase and/or the decompression phase is shortened, for example, in that the time is shortened in the manner described in which the inlet valve 25 and the outlet valve 30 of the combustion chamber 10 are closed simultaneously. Thereafter, the program branches to program point 120. At program point 120, the means 45 for relieving the piston 15 check whether a cylinder switchoff is possible; that is, whether the cylinder control 205 is present. If this is the case, then the program branches to program point 125; otherwise, the program branches to program point 130. In program point 125, the means 45 for relieving the piston 15 causes the cylinder control 205 to a continuous opening of the inlet valve 25 and of the outlet valve 30 of the combustion chamber 10. Thereafter, the program branches to program point 130. At program point 130, the electronic control unit 75 causes the means 40 for reducing fuel to reduce the fuel supply in the inlet channel 50 abruptly or continuously up to zero. Thereafter, there is a branching to the end 2000 of the program.

The invention was described with respect to a spark-ignition engine wherein a mixture of air and fuel is compressed. The invention is applicable in a corresponding manner to diesel engines wherein only air is compressed. Likewise, the invention is applicable to spark-injection engines having gasoline direct injection wherein a mixture of air and fuel or only air is compressed.

It is understood that the foregoing description is that of the preferred embodiments of the invention and that various changes and modifications may be made thereto without departing from the spirit and scope of the invention as defined in the appended claims.

What is claimed is:

1. A method of controlling a drive unit including an internal combustion engine, the method comprising the steps of:
   compressing air or a mixture of air and fuel in a combustion chamber of said engine utilizing compressor means; and,
   when switching off said engine, reducing the metering of fuel and initiating relieving load of said compressor means, wherein relieving of said load is initiated in advance of or during the activation of the reduction of the metering of the fuel.

2. The method of claim 1, wherein relieving load of said compressor is brought about by a reduction of the torque to be outputted by said engine.

3. The method of claim 2, wherein said torque is reduced by retarding an ignition time point.

4. A method of controlling a drive unit including an internal combustion engine, the method comprising the steps of:
   compressing air or a mixture of air and fuel in a combustion chamber of said engine utilizing compressor means; and,
   when switching off said engine, reducing the metering of fuel and initiating relieving load of said compressor means, wherein relieving load of said compressor is brought about by opening a throttle flap for the air supply in a non-fired state of the combustion chamber.

5. The method of claim 1, wherein relieving load of said compressor is brought about by shortening a compression phase.

6. The method of claim 1, wherein relieving load of said compressor is brought about by shortening the time in which the inlet and outlet valves of said combustion chamber are closed simultaneously.

7. The method of claim 1, wherein relieving load of said compressor is brought about by a continuous opening of the inlet and outlet valves of said combustion chamber.

8. The method of claim 1, wherein the compressor means is relieved of load in a first step by reducing the torque to be outputted by said engine; and, in a second step by shortening the compression phase; and, in a third step by a continuous opening of the inlet and outlet valves of the combustion chamber.

9. The method of claim 1, wherein said compressor means includes a piston.

10. An arrangement for controlling a drive unit including an internal combustion engine, the arrangement comprising:
    compressor means for compressing air or a mixture of air and fuel in a combustion chamber of said engine;
    means for reducing a metering of fuel to said engine when switching off said engine; and,
    means for initiating a relieving of said compressor means of load when switching off said engine in addition to reducing said metering of fuel, wherein said relieving of said compressor means is initiated in advance of or during the activation of a reduction of the metering of the fuel.

11. The arrangement of claim 10, wherein said compressor means includes a piston.

* * * * *